United States Patent [19]

Wagner

[11] 4,187,354

[45] Feb. 5, 1980

[54] PROCESS FOR LOWERING THE VISCOSITY OF FORMOSE OR MIXTURES OF FORMOSE IN MONO- AND/OR DI-SACCHARIDES, PRODUCTS PRODUCED THEREBY, AND THE USE THEREOF IN PRODUCING POLYURETHANE RESINS

[75] Inventor: Kuno Wagner, Leverkusen, Fed. Rep. of Germany

[73] Assignee: Bayer Aktiengesellschaft, Leverkusen, Fed. Rep. of Germany

[21] Appl. No.: 934,577

[22] Filed: Aug. 17, 1978

Related U.S. Application Data

[63] Continuation-in-part of Ser. No. 829,173, Aug. 30, 1977.

[30] Foreign Application Priority Data

Aug. 26, 1977 [DE] Fed. Rep. of Germany ....... 2738513

[51] Int. Cl.$^2$ ............................................. C08G 18/14
[52] U.S. Cl. ...................................... 521/158; 127/30; 127/31; 252/182; 260/921; 521/168; 528/72; 528/77; 536/117
[58] Field of Search ........................ 536/117; 260/921; 127/30, 31; 528/72, 77; 521/158, 168; 252/182

[56] References Cited

U.S. PATENT DOCUMENTS 3,808,159   4/1974   Matalon ............................... 521/158

OTHER PUBLICATIONS

Partridge et al., *Carbohydrate Research,* 24, 1972, pp. 29–44.

*Primary Examiner*—Maurice J. Welsh
*Attorney, Agent, or Firm*—Gene Harsh; Joseph C. Gil

[57] ABSTRACT

The invention broadly relates to greatly lowering the viscosity of the self-condensation products of formaldehyde (formose) by mixing formose with dialkyl phosphites; trialkyl phosphites and α-hydroxy- or α-aminophosphonic acid esters. These mixtures have the surprising capacity of dissolving large quantities of crystallized sugars. Compounds capable of aminoplast formation may also be advantageously mixed in. These mixtures have the remarkable ability of being used to make flame-resistant, open-celled, highly carbonizing rigid polyurea-polyurethane foams with isocyanate indexes of as low as 45 to 50.

11 Claims, No Drawings

PROCESS FOR LOWERING THE VISCOSITY OF FORMOSE OR MIXTURES OF FORMOSE IN MONO- AND/OR DI-SACCHARIDES, PRODUCTS PRODUCED THEREBY, AND THE USE THEREOF IN PRODUCING POLYURETHANE RESINS

This application is a continuation-in-part application of Ser. No. 829,173, filed Aug. 30, 1977.

This invention broadly relates to a process for lowering the viscosity of formose (or mixtures of formose with mono- or di-saccharides and/or aminoplast monomers and/or water) by the addition of dialkylphosphites and optionally trialkylphosphites and/or α-hydroxyphosphonic acid esters. The present invention also relates to low viscosity (at room temperature) isocyanate-reactive mixtures of formose, dialkyl phosphites and optionally water and/or mono- or di-saccharides and/or aminoplast monomers and/or trialkylphosphites and/or α-hydroxyalkyl phosphonic acid esters and/or α-aminoalkylphosphonic acid esters and to the use of such reactive mixtures for the production of polyurethane resins, in particular foams.

In the context of the present invention, the term "formose" means the known mixtures of low molecular weight polyhydroxyl compounds (polyhydric alcohols, hydroxy aldehydes and hydroxy ketones) which are formed by the condensation of formaldehyde hydrate.

BACKGROUND OF THE INVENTION

The preparation of mixtures of polyhydric alcohols, hydroxy aldehydes and hydroxy ketones by the auto-condensation of formaldehyde hydrate has been described in numerous literature references, for example the following: Butlerow and Loew, Annalen 120, 295 (1861); J. pr. Chem. 33, 321 (1886); Pfeil, chemische Berichte 84, 229 (1951); Pfeil and Schroth, chemische Berichte 85, 303 (1952); R. D. Partridge and A. H. Weiss, Carbohydrate Research 24, 29–44 (1972); the formoses of glyceraldehyde and dihydroxy-acetone according to Emil Fischer; German Pat. Nos. 822,385, 830,951 and 884,794, U.S. Pat. Nos. 2,224,910; 2,269,935 and 2,272,378 and British Pat. 513,708. These prior art processes have, however, certain disadvantages (toxicologically harmful catalysts, low volume/time yields and colored by-products). New processes have recently been developed by which virtually colorless formoses free from unwanted by-products may be obtained in high yields with the aid of the conventional catalysts.

According to one of these new processes, the condensation of formaldehyde hydrate is carried out in the presence of catalysts consisting of soluble or insoluble lead (II) salts or of lead (II) ions attached to a high molecular weight carrier and in the presence of a co-catalyst consisting of a mixture of hydroxy aldehydes and hydroxy ketones of the type obtained by the condensation of formaldehyde hydrate. The co-catalyst mixture is characterized by the following molar ratios:
Compounds having 3 carbon atoms/compounds having 4 carbon atoms: from 0.5:1 to 2.0:1;
Compounds having 4 carbon atoms/compounds having 5 carbon atoms: from 0.2:1 to 2.0:1;
Compounds having 5 carbon atoms/compounds having 6 carbon atoms: from 0.5:1 to 5.0:1;
wherein the proportion of components having from 3 to 6 carbon atoms is at least 75%, by weight, preferably more than 85%, by weight, based on the total quantity of cocatalyst.

The reaction temperature employed is generally from about 70° to 110° C., and preferably from 80° to 100° C. The pH of the reaction solution is adjusted by controlled addition of an inorganic or organic base so that it is maintained at from 6.0 to 8.0, preferably from 6.5 to 7.0 until from 10 to 60%, preferably from 30 to 50% conversion has been obtained. Thereafter, the pH is adjusted to a value of from 4.0 to 6.0, preferably from 5.0 to 6.0. It is surprisingly found that the ratio of components obtained in the resulting polyol, hydroxyaldehyde and hydroxy ketone mixtures may be varied in a reproducible manner by this particular method of pH control followed by cooling at different residual formaldehyde contents (from 0 to 10%, by weight, preferably from 0.5 to 6%, by weight).

When the auto-condensation of formaldehyde hydrate has been stopped by cooling and/or by inactivation of the lead catalyst with acids, the catalyst may be removed in known manner and the water contained in the products is evaporated off. Further details may be found in German Offenlegungsschrift No. 2,639,084.

According to another method by which highly concentrated colorless formoses may be prepared in high volume/time yields, aqueous formalin solutions and/or paraformaldehyde dispersions are condensed in the presence of a soluble or insoluble metal catalyst and in the presence of a co-catalyst. The co-catalyst is prepared by the partial oxidation of a dihydric or polyhydric alcohol (or mixture thereof) having a molecular weight of from 62 to 242 and at least two adjacent hydroxyl groups. During the condensation, the pH of the reaction solution is maintained at from 6.0 to 9.0 by controlled addition of a base until from 5 to 40% of the starting materials have undergone reaction. The reaction mixture pH is then adjusted to from 4.5 to 8.0 until the condensation reaction is stopped. In this second phase of the reaction the pH is from 1.0 to 2.0 units lower than in the first stage. The reaction is stopped by inactivation of the catalyst when the residual formaldehyde content is from 0 to 10%, by weight. The catalyst is then removed. This method has been described in detail in German Offenlegungsschrift 2,714,084.

Qualitatively superior formoses may also be prepared by the condensation of formaldehyde in the presence of a metal catalyst and more than 10%, by weight, based on the formaldehyde, of one or more dihydric or polyhydric low molecular weight alcohols and/or higher molecular weight polyhydroxyl compounds. Formose-polyol mixtures of this type are the subject matter of German Offenlegungsschrift No. 2,714,104.

It is particularly economic to prepare formose directly from formaldehyde-containing synthesis gases, i.e. without first obtaining aqueous formalin solutions or paraformaldehyde. For this purpose, the synthesis gases obtained from the large scale industrial production of formaldehyde are conducted continuously or discontinuously at temperatures of from 10° to 150° C. into an absorption liquid which consists of water, monohydric or polyhydric low molecular weight alcohols and/or higher molecular weight polyhydroxyl compounds and/or compounds capable of enediol formation as co-catalysts and/or soluble or insoluble metal compounds as catalysts, optionally attached to a high molecular weight carrier. The absorption liquid is at a pH of from 3 to 10. The formaldehyde is directly condensed in situ in the absorption liquid (or, if desired, in a reaction tube or a cascade of stirrer vessels situated behind the container for the absorption liquid). Auto-condensation of formaldehyde is stopped by cooling and/or inactivation of the catalyst using acids when the residual formaldehyde content in the mixture is from 0 to 10%, by weight, and the catalyst is finally removed. For further details about this process, see German Offenlegungsschrift No. 2,721,093.

Formoses prepared as described above may subsequently be converted into the corresponding hemiacetals with excess formaldehyde or α-methylolated by reaction with formaldehyde in the presence of bases. Modified formoses of this type have also been described in some detail in German Offenlegungsschrift No. 2,721,186.

The properties of formose (average hydroxyl functionality, degree of branching, number of reducing groups) may be varied within wide limits by suitably controlling the formaldehyde condensation reaction. The further the degree to which the condensation reaction is continued, i.e. the lower the residual formaldehyde content when the condensation reaction is stopped, the higher will generally be the average molecular weight and hence hydroxyl functionality of the formoses obtained. Thus, if the condensation reaction is continued to a residual formaldehyde content of from 0 to 1.5%, by weight, the resulting formose contains approximately 25%, by weight, of constituents having 5 carbon atoms, 45%, by weight, of compounds having 6 carbon atoms and approximately 20%, by weight, of compounds having 7 or more carbon atoms. At the same time, a total of only about 10% of polyols, hydroxy ketones and hydroxy aldehydes having 2, 3 or 4 carbon atoms is obtained. This corresponds to an average hydroxyl functionality of approximately 5.

If the formaldehyde auto-condensation is stopped at somewhat higher residual formaldehyde contents, different distributions of the components of the starting mixtures will be obtained, as mentioned above. When the condensation reaction is stopped at a formaldehyde content of from 2 to 2.5%, a mixture of polyhydric alcohols, hydroxy aldehydes and hydroxy ketones having an average hydroxyl functionality of approximately 4 is obtained. Yet other distributions of components having an even lower average hydroxyl functionality are obtained when the condensation reaction is stopped at residual formaldehyde contents even higher than 2.5.

The functionality of the products may be further varied as desired by mixing the formose with difunctional or higher functional low molecular weight alcohols if particular effects are desired for subsequent application of the products. Low molecular weight polyhydric alcohols (molecular weights up to about 300) which may be added for this purpose include, for example, ethylene glycol, propane-1,2-diol, propane-1,3-diol, butane-1,4-diol, diethyleneglycol, dipropyleneglycol, triethylene glycol, tetraethylene glycol, dibutylene glycol, glycerol, trimethylol propane, pentaerythritol, sorbitol, butane triols, hexane triols and the like and ethoxylation products of these alcohols, as well as hydrogenated formose (formite). Amines and/or ethanolamines may also be added to the mixture.

Examples of these include mono-, di- and triethanolamine, mono-, di- and tri-isopropanolamine, N-alkanolamines, such as N-methyldiethanolamine and N-ethyldiethanolamine, and lower aliphatic monoamines and polyamines, such as ethylamine, ethylene diamine, diethylene triamine and triethylene tetramine.

DESCRIPTION OF THE INVENTION

According to an earlier proposal (see in particular German Offenlegungsschriften Nos. 2,639,084; 2,714,084 and 2,714,104 mentioned above), formoses may be used as polyol components in the polyisocyanate polyaddition process for the production of polyurethane resins. It has now been found that polyurethane resins, and particularly foam resins, having exceptionally high flame resistance may be produced in this way if a mixture of formose and dialkylphosphite is used as starting component instead of pure formose. Compared with pure formose, such mixtures have a surprisingly low viscosity, which is of great advantage for practical purposes because the mixtures may then easily be dosed. Moreover, mixtures of formose and dialkylphosphites surprisingly have the capacity of dissolving large quantities of crystallized sugars (mono- and/or di-saccharides). Compounds capable of aminoplast formation may also be added to the mixtures according to the present invention in order to obtain a further lowering in viscosity or further chemical modification.

The present invention thus relates to a process for lowering the viscosity of formoses by the addition of a dialkylphosphite viscosity reducing agent. Optionally, the dialkylphosphite may be used as a mixture with trialkylphosphites and/or α-hydroxyalkyl phosphonic acid esters and/or α-aminoalkylphosphonic acid esters and/or compounds which are capable of aminoplast formation.

The present invention also relates to isocyanatereactive mixtures comprising:

(A) from 3 to 97%, by weight, preferably from 10 to 95% by weight, most preferably from 30 to 80%, by weight, based on the sum of components (A), (B) and (C) of formose and optionally mono- and/or di-saccharides;

(B) from 3 to 97%, by weight, preferably from 5 to 90%, by weight, most preferably from 15 to 60%, by weight, based on the sum of components (A), (B) and (C), of dialkylphosphites and optionally trialkylphosphites and/or α-hydroxyalkylphosphonic acid esters and/or α-aminoalkylphosphonic acid esters; and (C) from 0 to 10%, by weight, preferably from 0.3 to 6%, by weight of water, based on the sum of components (A), (B) and (C).

The mixtures according to the present invention preferably contain, per mol of component (A), from 0.2 to 20 mol, most preferably from 0.7 to 5 mol, of component (B), and from 0 to 3 mol, most preferably from 0 to 1.5 mol, of water.

The mixtures according to the present invention may in addition contain up to 100 parts, by weight, preferably from 10 to 50 parts by weight, of aminoplast monomers, based on 100 parts by weight, of the mixture of (A), (B) and (C). The mixtures according to the present invention preferably contain from 0.5 to 3 mol of substances capable of aminoplast formation per mol of component (A).

Any formoses may, in principle, be used for the mixtures according to the present invention, but for the preferred purpose according to the present invention (production of polyurethane resins) it is advantageous to use those formoses which have been prepared by the recent processes of the Applicants described above. These formoses are generally colorless and free from undesirable by-products. It is preferred to use formoses which have an average molecular weight of from 92 to 360, most preferably from 100 to 240, and a sugar content (calculated as glucose having a molecular weight of 180) of from 4 to 85%, by weight, most preferably from 6 to 72% by weight. For some purposes, it is preferred to use formoses which have subsequently been α-aldolized by treatment with formaldehyde at basic pH ranges as described above. These formoses have a higher primary hydroxyl group content. Formoses (1) which have been converted into hemiacetals by further reaction with formaldehyde or (2) which have undergone inter-molecular or intra-molecular acetalization or ketalization by subsequent treatment with acids or (3) which have been otherwise modified by the addition of carbonyl compounds which have no hydroxyl group on the α-carbon atom or modified by a Maillard reaction or by acyloin condensation in the presence of cyanides or by means of phenoplast-formers may, of course, also be used according to the present invention. All these modified formoses are also considered as "formoses" for the purposes of the present invention.

As mentioned above, it is surprisingly found that relatively large quantities of crystallized mono- and di-saccharides are soluble in the mixtures of the present invention. Such compounds include glucose, maltose, sucrose, natural invert sugar (for example honey), artificial invert sugar, e.g. hydrolysates of sucrose, degradation products of corn starch or potato starch and of pectins (amyloses and aminopectins) and hydrolysates of any other di- and/or poly-saccharides, such as trehalose, galactose, raffinose, cellulose and dextrins. This is of considerable technical interest because such crystallized mono- and di-saccharides are difficult to react with polyisocyanates in the pure form.

All these sugars may be present in component (A) in proportions of up to 70%, by weight, preferably up to 50%, by weight, (based on component (A)).

The compounds used as component (B) in the mixtures according to the present invention are preferably dialkylphosphites which have alkyl groups containing from 1 to 3 carbon atoms. Dimethyl-phosphite and diethylphosphite are particularly preferred. Phosphites having benzyl, cycloalkyl or alkyl groups having from 4 to 8 carbon atoms may also be added. Component (B) may also contain up to 80%, by weight, preferably up to 50%, by weight, of the corresponding trialkylphosphites, preferably trimethylphosphite, triethylphosphite and/or triisopropylphosphite and/or α-hydroxyalkylphosphonic acid esters and/or α-aminoalkylphosphonic acid esters.

α-hydroxyalkylphosphonic acid esters are, as is known, addition products of dialkylphosphites and aldehydes or ketones as represented, for example, in accordance with the following reaction scheme:

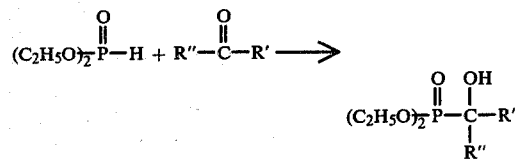

wherein
R' represents hydrogen or an alkyl, cycloalkyl, aryl or aralkyl group; and
R" represents an alkyl, cycloalkyl, aralkyl or aryl group or, together with R', an alicyclic ring.

Suitable aldehydes and ketones include, for example those having from 1 to 15, preferably from 1 to 9, carbon atoms, e.g. formaldehyde, acetaldehyde, propionaldehyde, butyraldehyde, isobutyraldehyde, acetone, methyl ethyl ketone, cyclopentanone, cyclohexanone, mesityl oxide, isophorone, acetophenone. Also suitable are the methylol derivatives of these compounds which may be obtained by base-catalyzed, partial or complete aldolization with formaldehyde on the carbon atom in the α-position to the carbonyl group.

α-aminoalkylphosphonic acid esters are formed by the addition of dialkylphosphites to aldimines or ketimines which have been formed from the above-mentioned aldehydes or ketones with monoamines or preferably polyamines (in particular diamines, such as tetramethylene diamine, pentamethylene diamine, hexamethylene diamine and 1-amino-3-aminomethyl-3,5,5-trimethylcyclohexane), e.g. in accordance with the following reaction scheme:

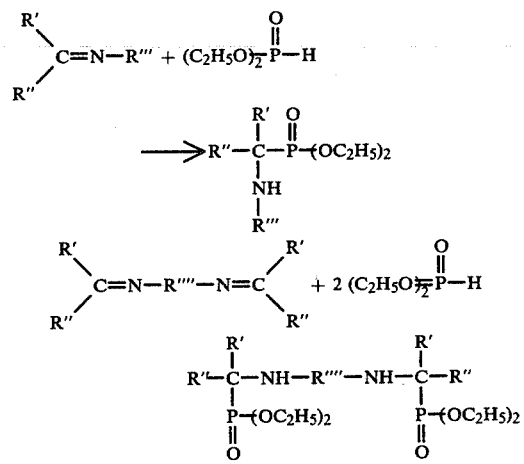

wherein
R' and R" are as defined above;
R''' represents a monovalent aliphatic, cycloaliphatic or araliphatic group having from 1 to 15, preferably from 2 to 12, carbon atoms; and
R'''' represents a divalent aliphatic, cycloaliphatic or araliphatic group having from 2 to 15, preferably from 2 to 12 carbon atoms.

α-hydroxyalkylphosphonic acid esters and α-aminoalkylphosphonic acid esters are also isocyanate-reactive compounds which are built into the polyurethane resin products during the reaction of the mixtures according to the present invention with polyisocyanates.

As mentioned above, aminoplast monomers may also be added for further modification of the mixtures according to the present invention. Any known compounds capable of aminoplast formation are suitable for this purpose, for example those described in German Offenlegungsschriften Nos. 2,324,134 and 2,713,198. It is generally preferred to use the N-methylolation products of these compounds because they are more easily built into the polyurethane resins during the reaction with polyisocyanates.

Preferred aminoplast monomers for the purposes of the present invention are: urea, symmetrically or asymmetrically substituted ureas, such as N,N-dimethyl (or -diethyl or -dibutyl)-urea, thiourea, dicyandiamide, melamine, oxamide, ethylene urea, ε-caprolactam, pyrrolidone-(2), aniline, acetylene-diurein and the N-methylol compounds of these monomers. The following are particularly preferred for the present invention: urea, N-monomethylolurea, N,N-dimethylolurea, thiourea, N- monomethylolthiourea, N,N-dimethylol thiourea, ε-caprolactam and N-methylol-ε-caprolactam.

As is well known, natural sugars, such as d-glucose, d-fructose, d-galactose, maltose, lactose and sucrose, are only slightly soluble or completely insoluble in polar organic solvents, both at room temperature and when heated to about 100° C. Most mono- and di-saccharides, such as glucose, galactose, fructose and lactose, are also virtually insoluble in methanol and ethanol at room temperature. Sucrose barely dissolves to a concentration of 1% by weight, in methanol or ethanol at room temperature and then only after a long time. This low solubility of mono- and polysaccharides in other organic compounds is to a large extent responsible for the fact that they mainly only function as fillers. When used in polyurethane forming formulations, they particpate only to a minimal extent in the polyisocyanate polyaddition reaction and then only in a heterogeneous reaction. It must therefore be regarded as extremely surprising that according to the present invention, formoses or mixtures of formoses with a wide variety of crystalline mono- and di-saccharides may be mixed in large proportions with dialkylphosphites. Even the addition of very small quantities of dialkylphosphite brings about a marked reduction in the viscosity of these mixtures. The addition according to the present invention of dialkylphosphites and optionally also aminoplast monomers to formose or formose/mono- and-/or disaccharide mixtures also improves the emulsifiability or miscibility thereof with various low molecular weight and higher molecular weight polyhydroxyl compounds of the type used for the production of polyurethane resins.

In the formoses which have been modified with dialkylphosphite according to the present invention, equilibria are established between free dialkylphosphite, hydroxymethanephosphonic acid esters of the following

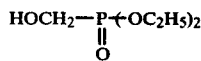

and α-hydroxyphosphonic acid esters of the following constitution

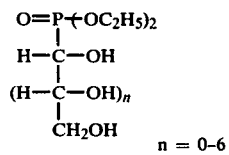

n = 0–6 depending on the formaldehyde content of the mixture and the temperature. The formaldehyde may be, for example, in the form of hemiacetals with the hydroxyl groups of formose or attached to N-methylol groups of the aminoplast monomers.

At reduced pressure and particularly in the presence of catalytic quantities of inorganic bases or, preferably, tertiary amines, such as triethylamine or dimethylbenzylamine, and/or at reduced pressure the compounds of the mixtures surprisingly rapidly enter into molecular rearrangement reactions and transesterification reactions at reduced pressure. These reactions are accompanied by the elimination of alcohol. Cyclic phosphites of formose i.e. having structural units of the formula

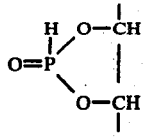

are formed or inter-molecular linkage of the formose takes place to give rise to higher molecular weight polyphosphites or formose esters of hydroxymethylphosphonic acid. Any degree of transesterification may be obtained, depending on the quantity of alcohol split off. Hence, the viscosities may be adjusted to values ranging from about 300 mPas at 20° C. to about 110,000 mPs at 20° C.

This subsequent chemical modification of the mixtures according to the present invention is preferably carried out to a temperature of from 20° to 90° C., most preferably from 25° to 65° C., and at pressures of from 0.1 to 100 Torr, most preferably from 0.3 to 20 Torr. The modification reactions mentioned above will be described in more detail in the Examples 1,3 and 6.

Up to 150%, by weight, preferably from 10 to 100%, by weight, of fillers such as aluminum hydroxide, may be stirred into the mixtures according to the present invention. Stable, non-sedimenting, pasty dispersions are thereby obtained. These dispersions are eminently suitable for the manufacture of filler-containing polyurethane foams.

The mixtures according to the present invention may also be used as flame retarding agents for synthetic resins and textiles. They also act as antifreezes having an anticorrosive action.

The mixtures according to the present invention may be prepared by simply mixing the various starting components in any sequence. It is preferable to start with formose, optionally containing water. This may be mixed with the aminoplast monomer, if used, followed by any α-aldolized formoses and mono- and/or di-saccharides used. The mixtures are then dehydrated to a water content of from 0.5 to 10%, e.g. at reduced pressure and from 30° to 60° C., and the dialkylphosphite is added to form a clear solution. Alternatively, any residual formaldehyde bound as hemiacetal still left in the formose solution after termination of the condensation reaction may be recovered by addition of the dialkylphosphite to form the corresponding hydroxymethylphosphonic acid ester, optionally after dehydration to a water content of from 0.5 to 4%. Any other components to be used may then be added. Individual components of the mixture (aminoplast monomers, mono- or di-saccharides and additional aldehydes and ketones) may, of course, already be added to the reaction mixture during the formose synthesis, and the dialkyl phosphites may be added subsequently, preferably after dehydration of the mixtures to a water content of from 0.5 to 10%. The above-mentioned aldehydes and ketones and mono- or poly-aldimines or ketimines, as well as aldehydes and ketones may, of course, be added subsequently to the mixtures according to the present invention, together with the monoamines or polyamines. In that case, hydroxyalkyl-phosphonic acid esters or amino or polyaminophosphonic acid alkyl esters are prepared in situ in the mixture according to the present invention.

As mentioned above, the main purpose of the mixtures according to the present invention is the preparation of exceptionally flame resistant polyurethane resins, in particular polyurethane foam resins.

The present invention therefore also relates to a process for the production of cellular or non-cellular polyurethane resins by the reaction of:

(a) polyisocyanates; with
(b) polyhydroxyl compounds having a molecular weight below 400; and, optionally,
(c) polyhydroxyl compounds having a molecular weight of from 400 to 10,000 and optionally other isocyanate-reactive compounds; optionally in the presence of
(d) blowing agents, catalysts, fillers and other known additives;

where the mixtures according to the present invention, optionally modified by the aforesaid transesterification reactions and rearrangement reactions, are used as component (b).

Since the mixtures according to the present invention generally contain substantial quantities of water (water is very difficult to remove completely from formose mixtures) the mixtures according to the present invention are particularly suitable for the production of polyurethane foams. Both open-celled and closed-celled rigid polyurethane foams and open-celled flexible foams may be produced, depending on the formulation employed.

For the production of open-celled rigid foams, it is suitable to employ formulations which contain from 4 to 25%, by weight, most preferably from 8 to 20%, of water. The above-mentioned suspensions of aluminum hydroxide or other mineral fillers may also be used in the mixtures according to the present invention. Up to 100%, by weight, preferably from 10 to 50%, by weight, based on the total polyol component, of a higher molecular weight polyhydroxyl compound (molecular weight from approximately 400 to 10,000) may also be added as an elasticizing component. The quantity of polyisocyanate in the formulation may vary within wide limits. Both an excess of polyisocyanate (up to 120% of the calculated equivalent quantity) and less than the equivalent quantity, based on the sum of isocyanate reactive components, may be used. It was found, however, that the smaller the isocyanate index in the formulation (equivalent ratio of polyisocyanate to isocyanate-reactive compounds), the higher is the flame resistance obtained. It is therefore preferred to operate within a range of indices of from 20 to 70, most preferably from 30 to 60 and especially from 35 to 55.

For the production of closed-celled rigid foams, it is preferable to use mixtures according to the present invention which contain from 0 to 4%, most preferably from 0.7 to 3%, by weight, of water. Foaming is in this case brought about by the addition of low boiling liquids, such as fluorotrichloromethane. Similar isocyanate indices as mentioned above are best used.

The mixtures according to the present invention may also be used as cross-linking agents for the production of flexible open-celled foams. In such a case, they are used in proportions of from 5 to 30%, by weight, preferably from 5 to 20%, by weight, based on the whole polyol component. The remainder of the polyol component then consists of polyhydroxyl compounds having a molecular weight of from 400 to 10,000, preferably polyether polyols.

The isocyanates used as starting components for the production of cellular or non-cellular polymethylene resins may be aliphatic, cycloaliphatic, araliphatic, aromatic or heterocyclic polyisocyanates, such as those described, for example, by W. Siefken in Justus Liebigs Annalen der Chemie, 562, pages 75 to 136. These include ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl-cyclohexane (German Auslegeschrift No. 1,202,785, U.S. Pat. No. 3,401,190), hexahydrotolylene-2,4-diisocyanate and -2,6-diisocyanate and mixtures of these isomers, hexahydrophenylene-1,3-diisocyanate and/or 1,4-diisocyanate, perhydrodiphenylmethane -2,4'-diisocyanate and/or 4,4'-diisocyanate, phenylene-1,3-diisocyanate and -1,4-diisocyanate, tolylene-2,4-diisocyanate and -2,6-diisocyanate and mixtures of these isomers, diphenylmethane-2,4'-diisocyanate and/or 4,4'-diisocyanate, naphthylene-1,5-diisocyanate, triphenylmethane-4,4',4"-triisocyanate, polyphenyl-polymethylene polyisocyanates which may be obtained by aniline/formaldehyde condensation followed by phosgenation and which have been described, for example, in British Pat. Nos. 874,430 and 848,671, m- and p-isocyanatophenyl-sulphonyl isocyanates according to U.S. Pat. No. 3,454,606, perchlorinated aryl polyisocyanates, such as those described, for example, in German Auslegeschrift No. 1,157,601 (U.S. Pat. No. 3,277,138), polyisocyanates having carbodiimide groups as described in German Pat. No. 1,092,007 (U.S. Pat. No. 3,152,162), diisocyanates of the type described in U.S. Pat. No. 3,492,330, polyisocyanates having allophanate groups as described, e.g. in British Pat. No. 994,890, in Belgian Pat. No. 761,626 and in published Dutch Patent Application No. 7,102,524, polyisocyanates having isocyanurate groups, e.g. as described in U.S. Pat. No. 3,001,973, in German Pat. Nos. 1,022,789; 1,222,067, and 1,027,394 and in German Offenlegungsschriften Nos. 1,929,034 and 2,004,048, polyisocyanates having urethane groups as described, e.g. in Belgian Pat. No. 752,261 or in U.S. Pat. No. 3,394,164, polyisocyanates having acylated urea groups according to German Pat. No. 1,230,778, polyisocyanates having biuret groups as described, e.g. in German Pat. No. 1,101,394 (U.S. Pat. Nos. 3,124,605 and 3,201,372) and in British Pat. No. 889,050, polyisocyanates prepared by telomerization reactions as described, for example, in U.S. Pat. No. 3,654,106, polyisocyanates having ester groups, such as those mentioned, for example, in British Pat. Nos. 965,474 and 1,072,956, in U.S. Pat. No. 3,567,763 and in German Pat. No. 1,231,688, reaction products of the above-mentioned isocyanates with acetals according to German Pat. No. 1,072,385 and polyisocyanates containing polymeric fatty acid groups according to U.S. Pat. No. 3,455,883.

The distillation residues obtained from the commercial production of isocyanates which still contain isocyanate groups may also be used, optionally as solutions in one or more of the above-mentioned polyisocyanates. Mixtures of the above-mentioned polyisocyanates may also be used.

As a general rule it is particularly preferred to use commercially readily available polyisocyanates, such as tolylene-2,4-diisocyanate and 2,6-diisocyanate and mixtures of these isomers ("TDI"), polyphenyl-polymethylene polyisocyanates of the type which may be prepared by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates").

Suitable higher molecular weight polyhydroxyl compounds, in particular compounds having a molecular weight of from 800 to 10,000, preferably from 1000 to 6000, include, polyesters, polyethers, polythioethers, polyacetals, polycarbonates and polyester amides having at least two, generally from 2 to 8, but preferably from 2 to 4, hydroxyl groups of the type known for the production of both homogeneous and cellular polyurethanes.

Suitable polyesters having hydroxyl groups include, e.g. reaction products of polyhydric, preferably dihydric, alcohols, optionally with the addition of trihydric alcohols, and polybasic, preferably dibasic, carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or may be unsaturated.

The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. The following are examples of suitable polyhydric alcohols: ethylene glycol, propylene glycol-(1,2) and -(1,3), butylene glycol-(1,4) and -(2,3), hexane diol-(1,6), octanediol-(1,8), neopentylglycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol, sorbitol, methylglycoside, diethylene glycol, triethylene glycol, tetramethylene glycol, polyethylene glycols, dipropylene glycol, polypropylene glycols, dibutylene glycol and polybutylene glycols. The polyesters may also contain a proportion of carboxyl end groups. Polyesters of lactones, such as ε-caprolactone, or hydroxycarboxylic acids, such as ω-hydroxycaproic acid, may also be used.

The polyethers used according to the present invention which have at least two, generally from 2 to 8, preferably 2 or 3, hydroxyl groups are also known and are prepared, for example, by the polymerization of epoxides, such as ethylene oxide, propylene oxide, butylene oxide, tetrahydrofuran, styrene oxide or epichlorohydrin, either each on its own, e.g. in the presence of $BF_3$, or by addition of these epoxides, optionally as mixtures or successively, to starting components having reactive hydrogen atoms. Such starting compounds include water, ammonia alcohols, or amines, e.g. ethylene glycol, propylene glycol-(1,3) or -(1,2), trimethylolpropane, 4,4'-dihydroxydiphenylpropane, aniline, ethanolamine or ethylene diamine. Sucrose polyethers may also be used according to the present invention, e.g. those described in German Auslegeschriften Nos. 1,176,358 and 1,064,938. It is in many cases preferred to use polyethers which contain predominantly primary OH groups (up to 90%, by weight, based on all the OH groups present in the polyether). Polyethers modified with vinyl polymers, e.g. the compounds obtained by polymerization of styrene or acrylonitrile in the presence of polyethers (U.S. Pat. Nos. 3,383,351, 3,304,273; 3,523,093 and 3,110,695 and German Pat. No. 1,152,536), as well as polybutadienes which have OH groups, are also suitable.

Particularly suitable among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the co-components.

Suitable polyacetals include, for example, the compounds which may be prepared from the reaction of glycols, such as diethylene glycol, triethylene glycol, 4,4'-dioxethoxy diphenyl dimethylmethane and hexanediol, with formaldehyde. Suitable polyacetals for the purposes of the present invention may also be prepared by the polymerization of cyclic acetals.

The polycarbonates having hydroxyl groups may be of the type known for example those which may be prepared by the reaction of diols, such as propanediol-(1,3), butanediol-(1,4) and/or hexanediol-(1,6), diethylene glycol, triethylene glycol or tetraethylene glycol, with diarylcarbonates, e.g. diphenylcarbonate, or with phosgene.

Suitable polyester amides and polyamides include, for example, the predominantly linear condensates prepared from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxides and phenol/formaldehyde resins or of alkylene oxides and urea/formaldehyde resins are also suitable for the purposes of the present invention.

Representatives of these compounds which may be used according to the present invention have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, e.g. on pages 45 to 71.

Mixtures of the above-mentioned compounds which contain at least two hydrogen atoms capable of reacting with isocyanates and have a molecular weight of from 400 to 10,000 may, of course, also be used, for example mixtures of polyethers and polyesters.

The starting components used according to the present invention may also include compounds having a molecular weight of from 32 to 400 which have at least two isocyanate-reactive hydrogen atoms. These are also compounds containing hydroxyl groups and/or amino groups and/or thiol groups and/or carboxyl groups, preferably hydroxyl groups and/or amino groups, and they serve as chain-lengthening agents or cross-linking agents. They generally have from 2 to 8 hydrogen atoms capable of reacting with isocyanates, preferably 2 or 3 such hydrogen atoms.

The following are examples of such compounds: ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethylcyclohexane, 2-methyl-1,3-propanediol, glycerol, trimethylol propane, hexanetriol-(1,2,6), trimethylolethane, pentaerythritol, quinitol, mannitol, sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxy-diphenyl propane, dihydroxymethyl-hydroquinone, ethanolamine, diethanolamine, triethanolamine, 3-aminopropanol, ethylene diamine, 1,3-diaminopropane, 1-mercapto-3-aminopropane, 4-hydroxyphthalic acid, 4-aminophthalic acid, succinic acid, adipic acid, hydrazine, N,N-dimethylhydrazine, 4,4'-diamino-diphenylmethane, tolylenediamine, methylene-bis-chloroaniline, methylene-bis-anthranilic acid ester, diaminobenzoic acid esters and the isomeric chlorophenylenediamines.

In this case again there may be used mixtures of various compounds having a molecular weight of from 32 to 400 and containing at least two isocyanate-reactive hydrogen atoms.

According to the present invention, it is also possible to use polyhydroxyl compounds which contain high molecular weight polyadducts or polycondensates in a finely dispersed or dissolved form. Such modified polyhydroxyl compounds are obtained when polyaddition reactions (e.g. reactions between polyisocyanates and aminofunctional compounds) or polycondensation reactions (e.g. between formaldehyde and phenols and/or amines) are carried out in situ in the above-mentioned hydroxyl compounds. Processes of this type have been described, for example, in German Auslegesschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. These modified polyhydroxyl compounds may also be prepared according to U.S. Pat. No. 3,869,413 or German Offenlegungsschrift No. 2,550,860, by mixing a previously prepared aqueous polymer dispersion with a polyhydroxyl compound and then removing the water from the mixture.

When modified polyhydroxyl compounds of the type mentioned above are used as starting components for the polyisocyanate polyaddition process, polyurethane resins having substantially improved mechanical properties are in many cases obtained.

The exclusive reaction of anhydrous mixtures according to the present invention (without the addition of other isocyanate-reactive components) with powerfully elasticizing polyisocyanates, such as polyisocyanates which have a biuret structure (German Auslegeschrift No. 1,543,178) results in hard, scratch-resistant and solvent-resistant coatings and lacquers.

Another advantage of the mixtures according to the present invention for the reaction with polyisocyanates is that all the components of the mixture take part in the polyisocyanate polyaddition reaction and are built into the polyurethane. No solvents are released to the environment. Excess, unesterified dialkylphosphite also reacts with polyisocyanates, e.g. according to the following reaction scheme:

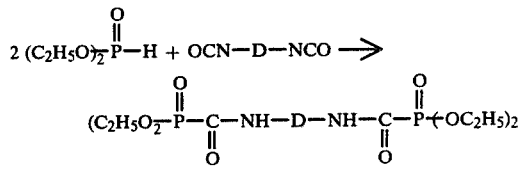

wherein D represents a divalent group as obtained by the removal of two isocyanate groups from a diisocyanate.

Phosphorus built into the polyurethane in this way or by the reaction of polyisocyanates with α-hydroxyalkyl phosphonic acid esters or α-aminoalkylphosphonic acid esters substantially increases the flame resistance of the resulting synthetic resin. Further improvement in the flame resistance is achieved by the additional use of aminoplast monomers in the mixtures according to the present invention.

The following Examples serve to illustrate the present invention. (Figures given denote parts, by weight, or percentages, by weight, unless otherwise indicated.)

EXAMPLES

Example 1

The formose used in this Example was prepared according to Example 1 of German Offenlegungsschrift No. 2,639,084. It has an average OH functionality of 4.68, an average molecular weight of 166, a water content of 5.6% and a viscosity of 24,500 mPas/50° C. At 25° C., the viscosity is no longer measurable and is above 550,000 mPas.

(a) 175.9 g of the formose (1 mol of formose) containing 5.6% of water are mixed with 138 g of diethylphosphite (1 mol) at 45° C. A clear, yellowish solution having a viscosity of only 273 mPas at 25° C. and a water content of approximately 3.1% is obtained.

(b) 179.9 g of formose are mixed with 110 g of dimethylphosphite (1 mol) at 45° C. A solution having a viscosity of only 174 mPas at 25° C. and a water content of approximately 3.4% is obtained.

Neither of the mixtures (a) and (b) tends to sediment higher molecular weight sugars, even at 0° C.

Mixtures (a) and (b) above are stable at room temperature and pH 7, as indicated by the constant viscosity. Under the influence of catalytic quantities of acids or bases (e.g. triethylamine, dimethylbenzylamine or endoethylenepiperazine), the dimethylphosphite or diethyl phosphite adds on to the carbonyl groups of the formose to form the corresponding α-hydroxyphosphonic acid esters. Besides transesterification reactions take place with elimination of methyl or ethyl alcohol to form phosphites of the sugars. The transesterification reactions may be carried out quantitatively by applying a vacuum and heating (e.g. 14 Torr and 55° C.).

Since the primary hydroxyl groups are easier to transesterify than the secondary hydroxyl groups, the products finally obtained are mainly compounds having the following idealized formula

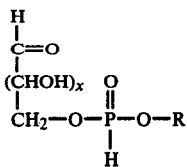

wherein
x represents an integer of from 0 to 6; and
r represents methyl or ethyl.

The viscosity of these monoesters is 34,000 mPas at 25° C. Under more vigorous transesterification conditions, these phosphite esters split off further quantities of alcohols and change into highly viscous, jelly-like, partially crosslinked sugar polyphosphites, e.g. those of the following idealized formula:

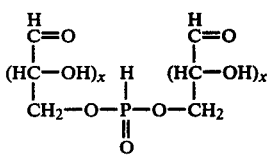

Owing to the dehydration reactions of the free hydroxyl groups of the sugars, cognac-colored to brown end products are obtained in the course of increasing degrees of transesterification.

Example 2

This Example shows that almost water thin solutions may be obtained by providing a larger quantity of dialkyl phosphite. These solutions may subsequently be converted whenever desired, into formose-phosphite esters having a particular degree of esterification.

175.9 g of the formose used in Example 1, which has a water content of 5.6%, are mixed with 484 g of dimethyl phosphite (4,4 mol) at 45° C. The clear, pale yellow solution obtained has the surprisingly low viscosity of 9 mPas at 25° C.

This solution is heated to 60° C. and 18 Torr for 10 hours. 100.8 g of methanol (3.15 mol) and 11 g of dimethyl phosphite are then distilled off. Of the 4.68 esterifiable OH equivalents present in the formose put into the process, an average of 3.15 OH equivalents have then been esterified. The viscosity of the solution rises substantially less than in Example 1 to only 131 mPas/25° C. due to the high degree of transesterification.

The hydroxyl groups present may also be almost quantitatively esterified by using from 5 to 8 mol of dimethylphosphite or dimethylphosphite per mol of formose. Substantially asymmetric formose-phosphite esters, e.g. those of the following idealized constitution

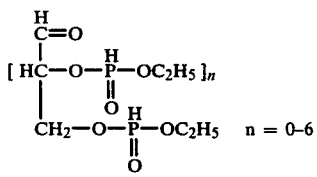

are then obtained. At this maximum degree of esterification and with the long condensation times required of from 11 to 18 hours, the end products are again cognac-colored to brown and are low viscosity solutions. This is due to the dehydration reactions of the free hydroxyl groups of the sugars.

Example 3

This Example shows that α-aldolized formose also forms very low viscosity mixtures with diethylphosphite or dimethylphosphite.

(a) Preparation of the α-aldolized formose: 500 g of a completely desalted aqueous solution containing 50%, by weight, of formose, prepared according to Example 1 of German Offenlegungsschrift No. 2,639,084 (250 g formose solid content; average molecular weight approximately 168; approximately 149 mol) are mixed with 149 g of a 30% formalin solution (approximately 1.49 mol) and 10 g of triethylamine. The reaction mixture is heated to 85° C. with stirring and the reduction in formaldehyde content is followed by titration with sodium sulphite. After only 45 minutes, the formaldehyde content of the solution has fallen from 6.3% to 0.5% and α-aldolization is completed. The hot solution is clarified by the addition of 8 g of active charcoal and filtered. A solution having a slightly yellow tinge is obtained. This solution contains mainly α-methylolated formose represented by the following idealized constitution:

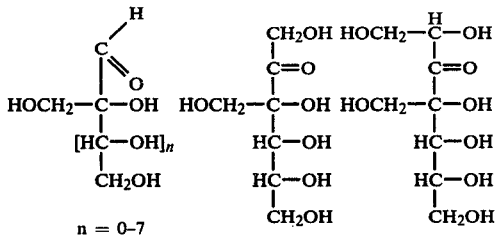

By controlled α-aldolization, there are obtained formoses which contain an average of at least two primary hydroxyl groups per molecule and are therefore more highly reactive with polyisocyanates than the original formoses.

It is surprisingly found that in this procedure, α-aldolization is a strongly preferential reaction compared with possible crossed Cannizzaro reactions. The analytically determined quantity of formate ions indicates that only about 3 g of the formaldehyde put into the process (approximately 7% of the total quantity) take part in crossed Cannizzaro reactions.

the viscosity of the resulting aldolized formose which has been evaporated down to a water content of 5.2% in a rotary evaporator, is not measurable either at 25° C. or at 35° C., and is over 570,000 mPas. At 50° C., the viscosity of the formose is 25,736 mPas. The average molecular weight of this α-aldolized formose is approximately 198.

When 198 g of the α-aldolized formose (1 mol of formose solid content) are mixed with 138 g of diethylphosphite (1 mol) at 50° C., a clear, yellowish solution is obtained, which has a viscosity of only 576 mPas at 25° C.

Example 4

241 g of a mixture of 1 mol of formose according to Example 1 of German Offenlegungsschrift No. 2,639,084, 1.12 mol of urea and 0.5 mol of water, are mixed and the components dehydrated in a rotary evaporator at 15 Torr and 55° C. The mixture has a viscosity of 81,000 mPas at 35° C. but is converted into a completely clear solution having a viscosity of only 127 mPas at 35° C. by the addition of 204 g (1.48 mol) of diethylphosphite.

Example 5

The procedure is the same as in Example 4, but the urea is replaced by 1.12 mol of ε-caprolactam. The resulting solution has a viscosity of only 27 mPas at 35° C.

Example 6

This Example describes the preparation of another type of mixtures according to the present invention. The mixtures contain N-methylol compounds of thiourea, urea or ε-caprolactam in solution.

(a) 614 g of a mixture of 1.5 mol of formose from Example 1, 2 mol of monomethylolthiourea and 2.7 mol of water, are prepared by simply mixing the components in a 50% aqueous solution and dehydrating in a rotary evaporator at 55° C. and 15 Torr (viscosity at 25° C. and a water content of 8%: 2413 mPas). This mixture is then mixed with 690 g (5 mol) of diethylphosphite at room temperature. A mixture which has viscosity of only 600 mPas at 25° C. is obtained.

(b) The procedure is the same as under (a), but the monomethylol thiourea is replaced by 270 g (3 mol) of monomethylolurea. The viscosity of the formoseaminoplast monomer solution is 72,633 mPas/25° C. After modification with diethylphosphite it is only 300 mPas at 25° C.

(c) 1.5 mol of formose are mixed with 2 mol of N-methylol caprolactam and 0.57 mol of water as under (a). The mixture has a viscosity of 17,305 mPas at 25° C. By mixing 687 g of this formose-aminoplast monomer mixture with 690 g of diethylphosphite, a mixture having a viscosity of 120 mPas at 25° C. is obtained.

Mixtures (a), (b) and (c) are reactive solutions which not only react readily at from 50 to 70° C. under a vacuum of from 1 to 15 Torr to form formose-phosphite esters with elimination of ethanol, but also undergo condensation with the aminoplast monomer under these conditions to form amidophosphonic acid esters for example of the following formula:

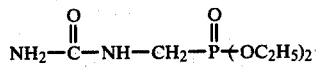

with elimination of water.

When the formoses used for preparing solutions of the type described under (a) to (c) contain formaldehyde bound in the hemiacetal form, hydroxymethane phosphonic acid diethyl ester, which is capable of condensation reactions analogous to those of diethylphosphite, is formed almost quantitatively from the diethylphosphite and the formaldehyde split off.

Example 7

166 g of the formose described in Example 1 are mixed with 132 g (1 mol) of the compound of the following formula:

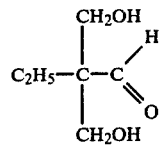

and 298 g of diethylphosphite to form a 50% mixture according to the present invention. The resulting solution has an astonishingly low viscosity of only 230 mPas at 25° C.

Example 8

This Example shows that even almost completely dehydrated formoses, having a water content of about 0.7%, dissolve in diethylphosphite or dimethylphosphite to form mixtures with greatly reduced viscosities.

The formose described in Example 1 (dewatered to at water content of about 0.7%) is dissolved in diethylphosphite at various concentrations at 50° C. The following relationships between viscosity and concentration are obtained:

Table

| % Formose content in diethylphosphite | Viscosity in mPas |
|---|---|
| 10 | 2.7 |
| 20 | 4.7 |
| 30 | 13.5 |
| 40 | 45.6 |
| 50 | 223 |
| 60 | 2.519 |
| 70 | 18,407 |

Example 9 (Example of Use)

This Example demonstrates the technically particularly interesting possibility of using the mixtures according to the present invention for the production of extremely flame-resistant, open-celled, highly carbonizing rigid polyurea-polyurethane foams within an isocyanate index of from 45 to 50, i.e. with less than equivalent quantities of polyisocyanates.

(a) 88 parts, by weight, of mixture (b) described in Example 6 are mixed at 35° C. with 40 parts, by weight, of a copolyether of propylene oxide and ethylene oxide which has been started on trimethylolpropane and has the OH number 28. The copolyether is used as an elasticizing agent. The polyether contains 0.7 parts, by weight, of an emulsifier having the following constitution:

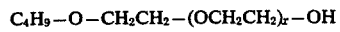

(the average value for x is 20).

3 parts, by weight, of water; 1.2 parts, by weight, of a commercial silicon stabilizer (stabilizer "OS 610" of Bayer AG), 0.2 parts by weight, of endoethylene-piperazine and 0.25 parts, by weight, of tin-II octoate are added to the vigorously stirred mixture. 184 parts, by weight, of a phosgenation product of a commercial aniline/ formaldehyde condensate are then stirred in. The polyisocyanate used has an isocyanate content of 29%. Foaming is completed after 6 minutes, with a very uniform rise time and no tendency to shrinkage. An open-celled rigid foam having built in flame retarding agent and having a density of 30 kg/m³ is obtained.

Strips of rigid foam 2 cm in width, 1 cm in thickness and 10 cm in length cut from the sample cannot be ignited when flamed with a Bunsen flame. The speed of propagation of a flame is therefore zero. When the strip is flamed with the Bunsen flame for more than 30 seconds, again no flame spread occurs. The burning merely carbonizes the foam with elimination of combustion gases containing a considerable quantity of water.

(b) The procedure is the same as described under (a), but 5 parts, by weight, of a mixture consisting of formose and N-methylolcaprolactam (1:1) is added. The reaction between isocyanate groups and water is thereby strongly activated and the fluidity of the system is prolonged. A rigid foam, again having excellent flame resistance and having a density of 26 kg/m$^3$ is obtained.

(c) When the mixture according to the present invention described in Example 6 (b) is used for impregnating reactions or matrix reactions in soft polyurethane foams, even those polyurethane foams which are readily inflammable before modification become so flame-resistant that they are self-extinguishing after ignition with a Bunsen flame.

What is claimed is:

1. A process for lowering the viscosity of formose or mixtures of formose and mono- and/or di-saccharides by the addition of a viscosity reducing agent wherein dialkylphosphites comprise the viscosity reducing agents.

2. Isocyanate-reactive mixtures comprising
    (A) from 3 to 97%, by weight, based on the sum of components (A), (B) and (C), of formose and optionally mono- and/or di-saccharides;
    (B) from 3 to 97%, by weight, based on the sum of components (A), (B) and (C), of dialkylphosphites and optionally trialkylphosphites and/or α-hydroxyalkylphosphonic acid esters and/or α-aminoalkylphosphonic acid esters; and
    (C) from 0 to 10%, by weight, based on the sum of components (A), (B) and (C), of water.

3. The mixtures of claim 2 which comprise from 10 to 95%, by weight, of component (A), from 5 to 90%, by weight, of component (B) and from 0.3 to 6%, by weight, of water.

4. The mixtures of claim 2 which comprise from 30 to 80%, by weight, of component (A), from 15 to 60%, by weight, of component (B) and from 0.3 to 6%, by weight, of water.

5. The mixtures of claim 2 comprising 1 mol of component (A), from 0.2 to 20 mol of component (B) and from 0 to 3 mol of water.

6. The mixtures of claim 2 comprising 1 mol of component (A), from 0.7 to 5 mol of component (B) and from 0 to 1.5 mol of water.

7. The mixtures of claim 2 comprising up to 100 parts, by weight, based on 100 parts, by weight, of the mixture of components (A), (B) and (C), of compounds capable of aminoplast formation or of the N-methylol derivatives thereof.

8. The mixtures of claim 7 comprising from about 10 to about 50%, by weight, of the substance which is capable of aminoplast formation.

9. In a process for the preparation of cellular or non-cellular polyurethane resins by the reaction of:
    (A) polyisocyanates; with
    (B) polyhydroxyl compounds having a molecular weight below 400; optionally
    (C) polyhydroxyl compounds having a molecular weight of from 400 to 10,000 and optionally other isocyanate-reactive compounds; optionally in the presence of
    (D) blowing agents, catalysts, fillers and other known additives,
the improvement which comprises using as component (B) isocyanate-reactive mixtures, optionally modified by transesterification reactions comprising
    (A) from 3 to 97%, by weight, based on the sum of components (A), (B) and (C), of formose and optionally mono- and/or di-saccharides;
    (B) from 3 to 97%, by weight, based on the sum of components (A), (B) and (C), of dialkylphosphites and optionally trialkylphosphites and/or α-hydroxyalkylphosphonic acid esters and/or α-aminoalkylphosphonic acid esters; and
    (C) from 0 to 10%, by weight, based on the sum of components (A), (B) and (C), of water.

10. A process for the preparation of phosphorous acid esters of formose and optionally mono- and/or disaccharides, wherein isocyanate-reactive mixtures are transesterified with removal of the alcohol component of the dialkyl phosphite, which isocyanate reactive mixtures comprise
    (A) from 3 to 97%, by weight, based on the sum of components (A), (B) and (C), of formose and optionally mono- and/or di-saccharides;
    (B) from 3 to 97%, by weight, based on the sum of components (A), (B) and (C), of dialkylphosphites and optionally trialkylphosphites and/or α-hydroxyalkylphosphonic acid esters and/or α-aminoalkylphosphonic acid esters; and
    (C) from 0 to 10%, by weight, based on the sum of components (A), (B) and (C), of water.

11. The process of claim 10 wherein the alcohol is removed by application of a vacuum of from 0.3 to 20 Torr at a temperature of from 25° to 65° C.

* * * * *